United States Patent
Kitajima et al.

(10) Patent No.: US 10,989,554 B2
(45) Date of Patent: Apr. 27, 2021

(54) SYSTEM AND METHOD FOR EMOTION NAVIGATION ROUTING

(71) Applicant: Honda Motor Co., Ltd., Tokyo (JP)

(72) Inventors: Takeshi Kitajima, Wako (JP); Takao Fujiwara, Wako (JP); Yoshitaka Suzuki, Wako (JP); Kazuto Kawata, Wako (JP); Wonravee Chavalit, San Jose, CA (US); Jenny Le, Santa Clara, CA (US); Ryan Lacross, San Jose, CA (US); Shigeyuki Seko, Campbell, CA (US); Shuhei Kinoshita, Sunnyvale, CA (US); Yusuke Narita, Milpitas, CA (US); Toshiaki Takano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 85 days.

(21) Appl. No.: 16/111,369

(22) Filed: Aug. 24, 2018

(65) Prior Publication Data

US 2020/0064146 A1    Feb. 27, 2020

(51) Int. Cl.
*G01C 21/34* (2006.01)
*G01C 21/36* (2006.01)
*G10L 25/63* (2013.01)

(52) U.S. Cl.
CPC ....... *G01C 21/3484* (2013.01); *G01C 21/362* (2013.01); *G01C 21/3608* (2013.01); *G10L 25/63* (2013.01)

(58) Field of Classification Search
CPC ............ G01C 21/3484; G01C 21/3608; G01C 21/362; G10L 25/63
See application file for complete search history.

(56) References Cited

U.S. PATENT DOCUMENTS

| 9,623,876 | B1* | 4/2017 | Slusar | G09B 19/167 |
| 2007/0233337 | A1* | 10/2007 | Plishner | G05D 1/0295 |
| | | | | 701/23 |
| 2010/0109881 | A1* | 5/2010 | Eskandarian | A61B 5/7267 |
| | | | | 340/575 |
| 2011/0022298 | A1* | 1/2011 | Kronberg | G01C 21/3484 |
| | | | | 701/532 |
| 2012/0212353 | A1* | 8/2012 | Fung | B60K 28/06 |
| | | | | 340/905 |
| 2013/0226408 | A1* | 8/2013 | Fung | B60W 40/09 |
| | | | | 701/41 |
| 2014/0100734 | A1* | 4/2014 | Yamashiro | G08G 1/22 |
| | | | | 701/23 |
| 2014/0278027 | A1* | 9/2014 | Burke | G08G 1/22 |
| | | | | 701/117 |

(Continued)

FOREIGN PATENT DOCUMENTS

| JP | 2004132873 | 4/2004 |
| JP | 2005190082 | 7/2005 |
| JP | 2010197071 | 9/2010 |

*Primary Examiner* — Rami Khatib
(74) *Attorney, Agent, or Firm* — Rankin, Hill & Clark LLP

(57) ABSTRACT

A computer-implemented method for controlling navigation includes generating an emotion data of a first user that illustrates emotion of the first user based on information received from a sensor. The method includes transmitting the emotion data of the first user to a controller configured to control a navigation of a second user. The first user and the second user are members of a same group. The method includes modifying the navigation of the second user according to the emotion data of the first user.

17 Claims, 5 Drawing Sheets

(56) References Cited

U.S. PATENT DOCUMENTS

| | | | |
|---|---|---|---|
| 2015/0081157 A1* | 3/2015 | Banasky, Jr. | G01C 21/3438 |
| | | | 701/29.1 |
| 2015/0153733 A1* | 6/2015 | Ohmura | G05D 1/0061 |
| | | | 701/23 |
| 2017/0176198 A1* | 6/2017 | Tatourian | G08G 1/205 |
| 2017/0293296 A1* | 10/2017 | Stenneth | G06Q 20/10 |
| 2018/0174457 A1* | 6/2018 | Taylor | G06K 9/00302 |
| 2019/0392235 A1* | 12/2019 | Shimizu | G07C 5/008 |

\* cited by examiner

SYSTEM AND METHOD FOR EMOTION NAVIGATION ROUTING

BACKGROUND

Multiple users are sometimes part of a group and control of each user in the group can be coordinated for the entire group. For example, each user can be part of a touring group, a convoy, a platoon, a fleet, among others. Although each user acts according to the group, each user can have conditions or circumstances that affect the user. Communication of these conditions or circumstances and changes to coordinated navigational control of the group can be implemented to provide a better driving and/or travelling experience for the group.

BRIEF DESCRIPTION

According to one aspect, a computer-implemented method for controlling navigation including generating an emotion data of a first user illustrating emotion of the first user based on information received from a sensor and transmitting the emotion data of the first user to a controller configured to control a navigation of a second user. The first user and the second user are members of a same group. The method includes modifying the navigation of the second user according to the emotion data of the first user.

According to another aspect, a system for controlling navigation includes a first controller configured to generate an emotion data of the first user illustrating emotion of the first user based on information received from a sensor. The system includes a second controller operably connected for computer communication to the first controller. The first controller is configured to transmit the emotion data of the first user to the second controller, and the second control is configured to control navigation for a second user. The first user and the second user are members of a same group. Further, the second controller modifies navigation of the second user according to the emotion data of the first user.

According to a further aspect, a non-transitory computer-readable storage medium storing instructions that, when executed by a computer, causes the computer to perform a method including receiving information about a first user, generating emotion data of the first user illustrating emotion of the first user based on the information about the first user, and transmitting the emotion data of the first user to a controller. The controller controls navigation for a second user, wherein the first user and the second user are members of a same group. Further, the method includes modifying navigation for the second user according to the emotion data of the first user.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
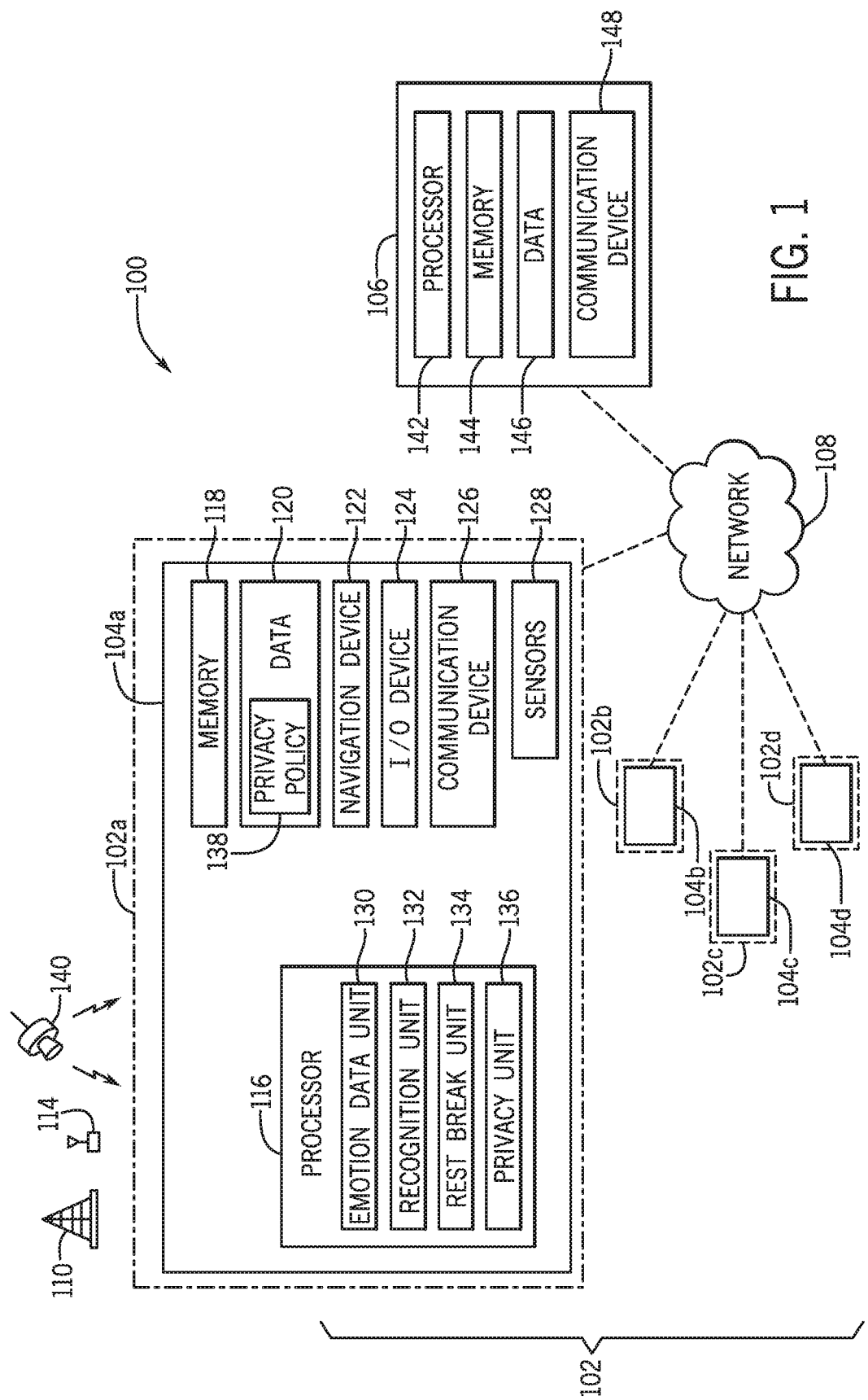
FIG. 1 is a schematic view of an exemplary group-navigating system for controlling navigation of one or more vehicles according to one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods discussed herein are generally directed to controlling navigation of one or more users that are part of a same group (e.g., a crew group, a touring group, a vehicle convoy). In particular, as will be discussed herein, navigation of a user can be controlled based on an emotion of another user. Referring now to the drawings, wherein the showings are for purposes of illustrating one or more exemplary embodiments and not for purposes of limiting the same, FIG. 1 is a schematic view of an exemplary group-navigating system 100 for controlling navigation according to one embodiment will be described. FIG. 1 includes a first user 102a, a second user 102b, a third user 102c, and a fourth user 102d, although it is understood that the systems and methods discussed herein can be implemented with more than (2) users. In some embodiments, the first user 102a, the second user 102b, the third user 102c, and the fourth user 102d, can be referred to as a group of users 102, where each user is a member of the same group.

In FIG. 1, each user is associated with a computing device that controls navigation of its respective user. More specifically, the first user 102a is associated with a first computing device 104a, the second user 102b is associated with a second computing device 104b, the third user 102c is associated with a third computing device 104c, and the fourth user 102d is associated with a fourth computing device 104d. In some embodiments, each of the computing devices are portable devices (e.g., smart phone, tablet, wearable device) that are associated with, controlled by, and/or in possession of the respective user. In some embodiments, the first computing device 104a, the second computing device 104b, the third computing device 104c, and the fourth computing device 104d can be referred to as a group of computing devices 104, where each computing device is registered to the same group. In some embodiments, which will be discussed herein in further detail with FIG. 2, the computing devices are located within a vehicle and/or are integrated as a component of a vehicle itself. In this embodiment, the computing devices can control one or more components of a vehicle including various vehicle systems for navigational control of the vehicle.

In FIG. 1, a block diagram of the first computing device 104a and a remote server 106 are shown. Simplified schematic diagrams of the second computing device 104b, the third computing device 104c, and the fourth computing device 104d are also shown. However, it is understood that although not shown in FIG. 1, one or more of the components of the first computing device 104a, can also be implemented with the second computing device 104b, the third computing device 104c, the fourth computing device 104d, the remote server 106, other entities, and/or devices (e.g., V2I, V2X devices) operable with the group-navigating system 100. Further, the components of the group-navigating system 100, the first computing device 104a, the remote server 106, well as the components of other systems, hardware architectures, and software architectures discussed herein, can be combined, omitted, or organized into different architectures for various embodiments.

As mentioned above, and as will be discussed herein, navigation of one or more users that are part of a same group can be controlled. In FIG. 1, the first user 102a, the second user 102b, the third user 102c, and the fourth user 102d are members of the group of users 102. Said differently, the first computing device 104a, the second computing device 104b, the third computing device 104c, and the fourth computing device 104d are registered to the same group 102. In some embodiments, the group of users 102 can have the same navigation destination, but in some embodiments, one or more of the users in the group of users 102 can have different navigation routes to the same navigation destination. The group of users 102 can generally include a group leader and one or more group followers. As will be discussed herein, the group leader manages and/or guides the group followers. For example, the computing device associated with the group leader can determine a navigation route and/or a navigation destination for one or more users in the group of users 102. The group leader and/or the computing device associated with the group leader is preregistered as the group leader of the group of users 102. The group followers and/or the computing device associated with each group follower are preregistered as group followers of the group of users 102. In the embodiments and examples discussed herein, the first user 102a, the third user 102c, and the fourth user are group followers, while the second vehicle 202b is the group leader. However, it is understood that in other embodiments, any other user of the group of users 102 can be designated as the group leader. For example, the first user 102a can be the group leader and the second vehicle 202b can be a group follower.

Figure 2:
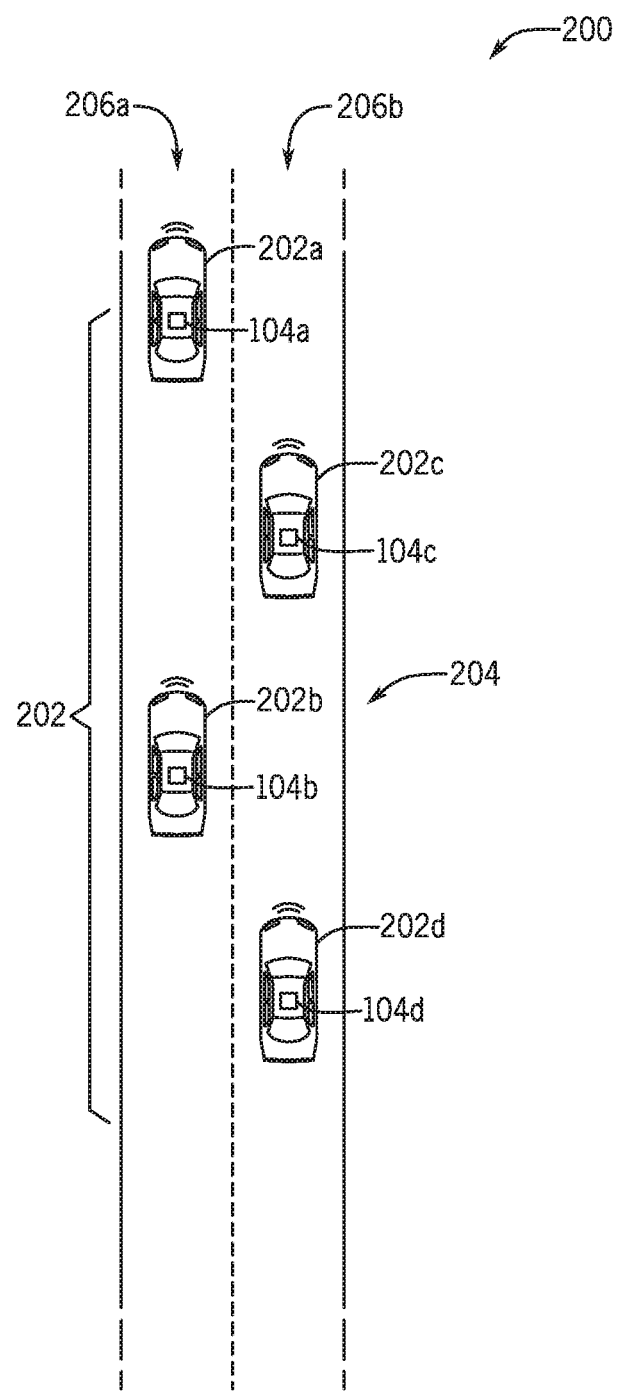
FIG. 2 is a schematic view of an exemplary traffic scenario according to one embodiment.

In some embodiments, the group of users 102 can be characterized as a touring group. For example, in some embodiments implemented within a vehicle context, the group of users 102 is a group of vehicles (e.g., a convoy, a fleet, a platoon). Referring now to FIG. 2, an exemplary traffic scenario 200 that will be used to describe systems and methods within a vehicle context is shown. The traffic scenario 200 includes a group of vehicles 202 travelling along a roadway 204, where the roadway 204 has a first lane 206a and a second lane 206b. It is understood that the roadway 204 can have various configurations not shown in FIG. 2 and can have any number of lanes or no lanes. For example, in one embodiment, the roadway 204 represents off-road terrain that does not have defined lines or lanes. Further, it is understood that each vehicle in the group of vehicles 202 can be configured in different positions than those shown in FIG. 2. For example, in some embodiments, each vehicle in the group of vehicles 202 follow one another in a single line of vehicles. Thus, each vehicle could be travelling in the first lane 206a where each vehicle follows one behind the other.

In FIG. 2, the group of vehicles 202 includes more than one vehicle (e.g., a plurality of vehicles) where each vehicle is a part (e.g., member) of a same group. More specifically, the group of vehicles 202 includes a first vehicle 202a, a second vehicle 202b, a third vehicle 202c, and a fourth vehicle 202d, and each of said vehicles are part of the same group of vehicles (i.e., the group of vehicles 202). Each vehicle in the group of vehicles 202 can include one or more users, for example, a driver, passengers, vehicle occupants, etc. For example, the first vehicle 202a can carry the first user 102a, the second vehicle 202b can carry the second user 102b, the third vehicle 202c can carry the third user 102c, and the fourth vehicle 202d, can carry the fourth user 102d. Thus, in one embodiment, the first user 102a is a crew of the first vehicle 202a, the second user 102b is a crew of the second vehicle 202b, and so on.

Accordingly, in some embodiments discussed herein, each vehicle can be associated with and/or include a computing device that can control navigation of the respective vehicle. Thus, as shown in FIG. 2, the first vehicle 202a can be associated with the first computing device 104a, the second vehicle 202b can be associated with the second computing device 104b, the third vehicle 202c can be associated with the third computing device 104c, and the fourth vehicle 202d can be associated with the fourth computing device 104d. The computing device could be integrated with the vehicle itself as a vehicle computing device, for example, as part of a telematics unit, a head unit, an infotainment unit, an electronic control unit, an on-board unit, or as part of a specific vehicle control system, among others. In some embodiments, the computing device is a separate device carried by the vehicle. Thus, as described above with FIG. 1, in some embodiments, the computing device is controlled and/or possessed by a user that is being carried by the vehicle. The computing device is pre-registered and can interface with other components of the vehicle (e.g., the sensors 128, other vehicle sensors (not shown), vehicle systems (not shown)). In some embodiments, the group of vehicles 202 can be, for example, a touring, a convoy, a platoon, a fleet, or any other type of group where the vehicles and/or the users of the vehicles are registered as members of the group. It is understood that although the group of vehicles 202 in FIG. 2 includes four vehicles, the group of vehicles 202 can include any number (e.g., less than four (4), more than four (4)) of vehicles.

As discussed above with the group of users 102 of FIG. 1, the group of vehicles 202 can have the same navigation destination, but in some embodiments, one or more of the vehicles can have different navigation routes to the same navigation destination. In FIG. 2, the group of vehicles 202 can have the same navigation destination, but each vehicle can have a different navigation route. For example, the first vehicle 202a and the second vehicle 202b travel along a different route (e.g., the first lane 206a) than the third vehicle 202c and the fourth vehicle 202d. As will be discussed in more detail herein, navigational control of a vehicle in the group of vehicles 202 can be determined based on information about a different vehicle and/or a different user in the group of vehicles 202.

In the systems and methods discussed herein in a vehicle context, the group of vehicles 202 can generally include a group leader vehicle and one or more group follower vehicles. As will be discussed herein, the group leader vehicle manages and/or guides the group follower vehicles. For example, the group leader vehicle and/or the computing device associated with the group leader vehicle can determine a navigation route and/or a navigation destination for one or more vehicles in the group of vehicles 202. The group leader vehicle is preregistered as the group leader vehicle of the group of vehicles 202 and the group follower vehicles are preregistered as group follower vehicles of the group of vehicles 202. In FIG. 2, the first vehicle 202a, the third vehicle 202c, and the fourth vehicle 202d are group follower vehicles, while and the second vehicle 202b is the group leader vehicle. However, it is understood that in other embodiments, any other vehicle of the group of vehicles 202 can be designated as the group leader vehicle. For example, the first vehicle 202a can be the group leader vehicle and the second vehicle 202b can be a group follower vehicle.

Referring back to FIG. 1, the first computing device 104a, the second computing device 104b, the third computing device 104c, the fourth computing device 104d, and the remote server 106 can each be operatively connected for computer communication with each other using, for example, a wireless communication network 108 and/or a wireless network antenna 110. However, it is understood that any type of communication or network protocol can be implemented, for example, ad hoc networks, wireless access within the vehicle, cellular networks, Wi-Fi networks (e.g., IEEE 802.11), Bluetooth, WAVE, CALM, among others.

With respect to the vehicle implementation of FIG. 2, the communication between the first vehicle 202a, the second vehicle 202b, the third vehicle 202c, the fourth vehicle 202d, can be implemented using Dedicated Short Range Communications (DSRC) using direct communication links (not shown) established between each vehicle (e.g., using vehicle transceivers). However, it is understood that communication using the vehicles can be implemented using any communication or network protocol, for example, those described above. Additionally, the group-navigating system 100 can be described in the context of a communication network as a vehicle-to-vehicle (V2V) communication network, a vehicle-to-infrastructure (V2I) communication network, or a vehicle-to-everything (V2X) communication network. Further, in some embodiments, the first vehicle 202a, the second vehicle 202b, the third vehicle 202c, the fourth vehicle 202d, and the remote server 106 can exchange data utilizing the wireless communication network 108, the wireless network antenna 110, roadside equipment (RSE) 114, and/or or other wireless network connections.

Generally, the computing device 104a can include provisions for processing, communicating and interacting with various components of the first vehicle 202a and other components of the group-navigating system 100, including the group of users 102 and the remote server 106. The first computing device 104a can generally include a processor 116, a memory 118, data (e.g., a disk, a data store) 120, a navigation device 122, an input/output (I/O) device 124, a communication device 126, and sensors 128, the components of which can each be operably connected for computer communication via a bus (not shown) and/or other wired and wireless technologies (e.g., as discussed above).

The processor 116 can include logic circuitry with hardware, firmware, and software architecture frameworks for facilitating control of the first computing device 104a and/or one or more users or computing devices of the group of users 102. Thus, in some embodiments, the processor 116 can store application frameworks, kernels, libraries, drivers, application program interfaces, among others, to execute and control hardware and functions discussed herein. For example, in FIG. 1, the processor 116 includes an emotion data unit 130, a recognition unit 132, a rest break unit 134, and a privacy unit 136, each of which will be discussed in more detail herein. In some embodiments, the memory 118 and/or the data store 120 can store similar components as the processor 116 for execution by the processor 116.

The navigation device 122 can include hardware and/or software to determine and/or acquire position data about the first user 102a and/or the first computing device 104a. For example, the navigation device 122 can include a global positioning system (GPS) unit (not shown) and/or an inertial measurement unit (IMU) (not shown). Thus, the navigation device 122 can provide a geoposition of the first user 102*a* and/or the first computing device 104*a* based on satellite data from, for example, a global position source 140, or from any Global Navigational Satellite infrastructure (GNSS), including GPS, Glonass (Russian) and/or Galileo (European). Further, the navigation device 122 can provide dead-reckoning data or motion data from, for example, a gyroscope, accelerometer, magnetometers, among other sensors (not shown).

In the embodiments discussed herein, the navigation device 122 can be a navigation system that provides navigation maps and navigation information to the first computing device 104*a* and can therefore control navigation of the first user 102*a* and/or the first computing device 104*a*. The phrase "navigation information" refers to any information that can be used to assist the first computing device 104*a* in navigating a path or a roadway. Navigation information may include traffic data, map data, and roadway classification information data. Examples of navigation information can include street addresses, street names, street or address numbers, intersection information, destination, route driving or travel style, points of interest, waypoints, parks, bodies of water, any political or geographical subdivision including town, township, province, prefecture, city, state, district, ZIP or postal code, and country. Navigation information can also include commercial information including business and restaurant names, commercial districts, shopping centers, and parking facilities. The navigation information discussed above can also be considered a route parameter of a navigational route. As will be discussed herein, one or more route parameters of a navigational route can be modified based on an emotion of a user in the group of users 102.

Referring again to the first computing device 104*a*, the I/O device 124 can include devices to allow input (e.g., user input) to the first computing device 104*a* and/or allow retrieval from the first computing device 104*a*. Further, the I/O device 124 can provide output from the first computing device 104*a* (e.g., display images, data and other feedback, such as described herein). As discussed above in detail, the I/O device 124 can allow for input to be received though a cursor controller, a mouse, a keyboard, a touch screen, gesture input, and other mechanisms adapted to communicate information or commands. Output devices can include a screen, a monitor, a touch screen, a navigation display, or any other similarly equipped display devices, etc.

Further, in the vehicle contexts described herein, the I/O device 124 can include various vehicle interface systems, such as a human machine interface (HMI) and/or a heads-up display (HUD). In some embodiments that will be discussed herein, the I/O device 124 can display information (e.g., graphics, warnings, and notifications). For example, the I/O device 124 can generate information, suggestions, warnings, and/or alerts and provide the same to a vehicle operator on a display device (e.g., display portion) of the I/O device 124. The information, warnings, etc., can include, but are not limited to, one or more navigation maps, navigation instructions, navigation routes, symbols, icons, graphics, colors, images, photographs, videos, text, audible information, among others. The I/O device 124 can also include other systems that provide visual, audible, and/or tactile/haptic feedback to a user. For example, an active force pedal (AFP), a tactile steering wheel, among others.

The communication device 126 can include software and hardware to facilitate data input and output between the components of the first computing device 104*a* and other components of the group-navigating system 100, including the group of users 102 and the remote server 106. Specifically, the communication device 126 can include network interface controllers (not shown) and other hardware (e.g., transceivers) and software that manages and/or monitors connections and controls bi-directional data transfer between the communication device 126 and other components of the group-navigating system 100. As mentioned above, the communication device 126 can implement the above functions using any communication or network protocols. In the embodiments discussed herein, the communication device 126 can transmit and/or receive, navigation information, vehicle information, biometric information, emotion data, notifications, and messages, among other types of information, to and from the group of users 102 and/or the remote server 106.

The sensors 128 can include various types of sensors for use with the first computing device 104*a* for detecting and/or sensing a parameter of the first user 102*a* and/or the first computing device 104*a*, the environment surrounding the first user 102*a* and/or the first computing device 104*a*, and/or the environment surrounding the group of users 102. With respect to the vehicle context described with FIG. 2, the sensors 128 can also include sensors implemented within the first vehicle 202*a* and the sensors 128 can detect and/or sense a parameter of the first vehicle 202*a*, a vehicle system (not shown), the environment surrounding the first vehicle 202*a*, and/or the environment surrounding the group of vehicles 202.

Further, with respect to the vehicle context described with FIG. 2, the sensors 128 can include various types of sensors for use with the first vehicle 202*a* for detecting and/or sensing a parameter of the first vehicle 202*a*, a vehicle system (not shown) of the first vehicle 202*a*, the environment surrounding the first vehicle 202*a*, and/or the group of vehicles 202. The sensors 128 can be disposed in any portion of the first vehicle 202*a*. Although not shown in FIG. 2, the sensors 128 can be located within or on the surface of a vehicle seat, a steering wheel, a headrest, a seat belt, an armrest, dashboard, rear-view mirror as well as any other location. Moreover, in some cases, the sensors 128 can include portable sensors that is worn by a user, associated with a portable device located in proximity to the user, such as a smart phone or similar device, associated with an article of clothing worn by the user or integrated into the body of the first user 102*a* (e.g. an implant). Further, it is understood, the sensors 128 can include multiple sensors that detect information about more than one user associated with the computing device 106*a* and/or the first vehicle 202*a*. For example, the sensors 128 can include sensors within the vehicle 202*a* for detecting information about more than one vehicle occupant (e.g., in addition to the first user 102*a*) being carried by the vehicle 202*a*.

In the embodiments discussed herein, the sensors 128 are generally part of the group-navigating system 100, and can include any system configured to provide monitoring information related to the first user 102*a* and/or the first computing device 104*a*. More particularly, the the sensors 128, retrieve and/or obtain information about each user in the group of users 102, for example, information about an emotion of the user or information to assess an emotion of the user. Thus, the sensors 128 can include, but are not limited to, optical devices, thermal devices, autonomic monitoring devices as well as any other kinds of devices, sensors or systems.

More specifically, in the embodiments discussed herein, the sensors 128 can include sensors for sensing information including emotion data about the first user 102*a*. Emotion data can include information about the human body of the first user 102*a* and the emotion data illustrates an emotion of the first user 102*a*. For example, emotion data can include, but is not limited to, heart rate, blood pressure, oxygen content, blood alcohol content (BAC), respiratory rate, perspiration rate, skin conductance, brain wave activity, digestion information, salivation information, among others. Thus, the sensors 128 can include, but are not limited to, heart rate sensors, blood pressure sensors, oxygen content sensors, blood alcohol content (BAC) sensors, EEG sensors, FNIRS sensors, FMRI sensors, bio-monitoring sensors, among others. It is understood that the sensors 128 can be contact sensors and/or contactless sensors and can include electric current/potential sensors (e.g., proximity, inductive, capacitive, electrostatic), acoustic sensors, subsonic, sonic, and ultrasonic sensors, vibration sensors (e.g., piezoelectric), optical sensors, imaging sensors, thermal sensors, temperature sensors, pressure sensors, photoelectric sensors, among others.

Generally, in the embodiments discussed herein, an emotion of a user (e.g., of the group of users 102) is determined based on the emotion data, which is sensed by the sensors 128. The emotion of the user (i.e., a biological being), as used herein, refers to a measurement of a state of emotion or feelings of the biological being. An emotion and/or a feeling can be one or more alert, excited, depressed, involved, uninvolved, energetic, vigilant, sleepy, fatigued, drowsy, inattentive, distracted, bored, engaged, disengaged, stressed, calm, relaxed, complacent, frustrated, peaceful, busy, ready, happy, confident, joyful, sad, intoxicated, other impaired states, other emotional states and/or general feeling states.

In some embodiments, the emotion of the user can be numerical or another kind of value for distinguishing between two or more states of a user. For example, in some cases, the current state of the user can be a level and can be given as a percentage between 0% and 100%. For example, with respect to a level of happiness, 0% can refers to a user that is totally sad and 100% refers to a user that is fully happy. In other cases, the state could be a value in the range between 1 and 10. In still other cases, the state is not a numerical value, but could be associated with a given discrete state, such as "not happy," "slightly happy," "happy," "very happy" and "extremely happy." The state could also be a discrete state that indicates a condition, for example, a good condition, a bad condition, a poor condition, a specific type of emotion, or feeling condition.

Referring again to FIG. 1 and the group-navigating system 100, the remote server 106 can be, for example, a service provider, and can include a processor 142, a memory 144, data (e.g., a disk, a data store) 146, and a communication device 148. In some embodiments, the first computing device 104*a* and/or one or more of the computing devices in the group of computing devices 104 can transmit and receive information directly or indirectly to and from the remote server 106 using, for example, the wireless communication network 108. In some embodiments, this information can include emotion data, traffic information, navigation information, high-traffic event schedules, weather information, or other transport related information.

As will be discussed herein, navigational routes are modified, calculated and/or determined by the first computing device 104*a* (e.g., the navigation device 122) of the first user 102*a* and/or the second computing device 104*b* (e.g., the navigational device (not shown)) of the second user 102*b*. However, it is understood that in some embodiments, the navigational routes can be determined by the processor 142 of the remote server 106, and the remote server 106 can transmit the navigational routes and/or control navigation of one or more of the users of the group of users 102. Thus, in some embodiments, the processor 142 can include the same or similar components and functionality as the processor 116. In other embodiments, information from the remote server 106 can be used by one or more of the users of the group of users 102 to determine, modify, and/or calculate navigation routes. Modification of navigational routes for one or more users that are part of the same group of users 102 will now be discussed in more detail.

II. Methods for Controlling Navigation of One or More Vehicles that are Part of a Same Group Referring now to FIG. 3 a process flow diagram of a method 300 for controlling navigation according to an exemplary embodiment is shown. The methods discussed herein will reference the components of FIGS. 1 and 2. Although the methods are primarily described within the user context of FIG. 1, it is understood that methods can also be implemented within the vehicle context of FIG. 2. Further, it is understood that the blocks of the methods described herein can be combined, omitted, or organized into different architectures for various embodiments.

As discussed above with FIGS. 1 and 2, one or more users are part of a same group of users 102, for example, any type of group where each of the users 102 and/or the computing devices 104, are registered as members of the same group. In the embodiments discussed herein, the group of users 102 can have the same navigation destination, however, the navigation route to the same navigation destination can be different for one or more of the users in the group of users 102.

Figure 3:
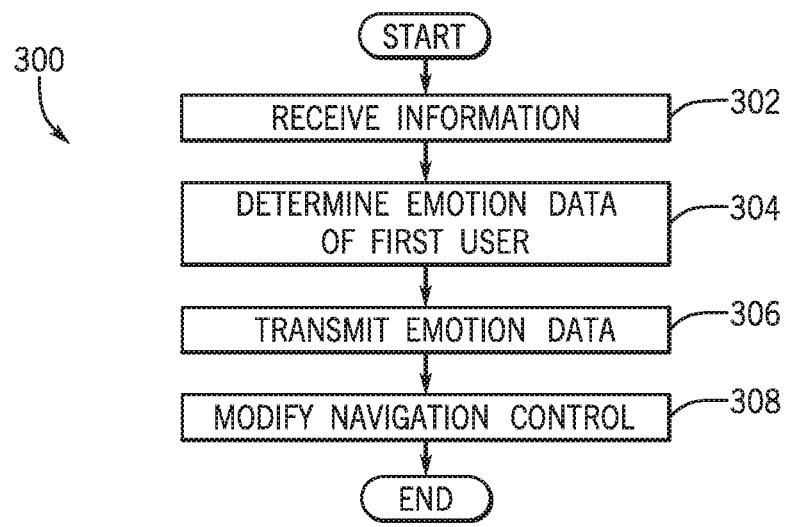
FIG. 3 is a process flow diagram of a method for controlling navigation of one or more users according to an exemplary embodiment.

Referring to FIG. 3, the method 300 includes, at block 302, receiving information. For example, the processor 116, using for example, the emotion data unit 130, can receive information about the first user 102*a* associated with the first computing device 104*a*. The information can be emotion data. As discussed above, the information (e.g., the emotion data) can be received from and/or sensed by the sensors 128. In some embodiments, information can be received about a second user, for example, the second user 102*b* associated with the computing device 104*b*. The second user 102*b* and the first user 102*a* are part of the same group of users 102. For example, information, including a second emotion data, can be received about the second user 102*b* from, for example, sensors ("a second sensor", not shown) of the second computing device 104*b*.

At block 304, the method 300 includes determining an emotion data of a first user. Said differently, at block 304, the processor 116 using, for example, the emotion data unit 130, can generate emotion data of the first user 102*a* illustrating an emotion of the first user 102*a* based on the information received from the sensors 128. As discussed above, the emotion can be an emotional state, a feeling, among others. In some embodiments, the processor 116 can determine and/or generate the emotion data and/or the emotion by calculating a value or a level based on the information (e.g., an average) received from the sensors 128. As will be discussed herein, in some embodiments, the processor 116 can compare and/or confirm the emotion data and/or the emotion with stored information and/or stored emotion states specific to the user. For example, normal states, normal levels, and/or normal information for the first user 102a can be stored at the first computing device 104a (e.g., memory 118 and/or the data 120) and/or the server 106 (e.g., the memory 144 and/or the data 146). The processor 116 can compare the information and/or the emotion state of the first user 102a with stored information and/or stored normal emotion states of the first user 102a. In other embodiments, the processor 116 can used normalized data (e.g., about an average user of the average population) from, for example, the server 106.

Referring again to the method 300, in some embodiments, block 304 can also include determining a second emotion data of another user in the same group of users 102. For example, block 304 can include generating a second emotion data of the second user 102b illustrating emotion of the second user 1022b based on information received from the sensors (not shown) of the second computing device 104b. It is understood that information, emotion data, and emotion information can be received and/or generated for any user in the group of users 102. Thus, any number of emotion states about one or more users in the group of users 102 can be determined. With respect to the vehicle context, in some embodiments, a collective state of all users in a vehicle can be determined based on information about all users in the vehicle. Thus, a collective emotion state for each vehicle can be determined based on the emotion data of vehicle occupants in each vehicle.

Referring again to the method 300, at block 306, the method 300 includes transmitting the emotion data. More specifically, in some embodiments, at block 306, the processor 116 transmits the emotion data of the first user 102a to a controller configured to control a navigation of the second user 102b. In some embodiments, the controller is the processor (not shown) the second computing device 104b. In other embodiments, the controller is the processor 142. As mentioned above, the first user 102a and the second user 102b are part of the same group of users 102. In this example, a group follower (i.e., the first user 102a) transmits the emotion data to a group leader (i.e., the second user 102b). Thus, in some embodiments, block 306 can also include recognizing a leader of the same group of users 102, where the controller is configured to control the navigation of the leader as the second user 102b. In some embodiments, the recognition unit 132 can identify the leader of the same group of users 102 based on registration of each user and/or computing device to the group of users 102.

For example, as mentioned above, each user of the group of users 102 is pre-registered to the group. Accordingly, each user and/or computing device can be associated with an identification number (e.g., stored at the computing device and/or the server 106) that indicates whether the user is a group follower or a group leader. As an illustrative example with respect to FIG. 1, the second user 102b can be recognized as the leader of the same group of users 102b and the processor 142 and/or the processor (not shown) of the second computing device 104b is the controller configured to control the navigation of the leader as the second user 102b. Notwithstanding the foregoing, it is understood that any user in the group of users 102 can exchange current state information about its respective users to other users in the group of users 102 and/or to the remote server 106.

At block 308, the method 300 includes modifying navigation control. More specifically, at block 308, the method 300 includes modifying the navigation of the second user 102b according to the emotion data of the first user 102a. Thus, the second computing device 104b can modify the navigation of the second user 102 based on the emotion of the first user 102a. In other embodiments, the second computing device 104b can modify the navigation of one or more users that are part of the group of users 102 based on the emotion of the first user 102a. It is understood that navigational control can be modified for any one of the users in the group of users 102 based on the emotion data of the first user 102a and/or the emotion data another user associated in the group of users 102.

In some embodiments, modifying the navigation at block 308 can include determining one or more alternative navigation routes based on the emotion data of the first user 102a. As mentioned above, each user in the group of users 102 can be controlled to navigate to the same destination. The navigation route to the same destination can be the same or different for one or more users in the group of users 102. As an illustrative example with respect to the vehicle context of FIG. 2, the first vehicle 202a can navigate to a destination with a navigation route that includes a rest stop (e.g., a waypoint), while the second vehicle 202b can navigate to the same destination, but with a navigation route that does not include any stops along the way. Accordingly, in one embodiment, modifying the navigation control at block 308 can include calculating and/or determining an alternative navigation route by modifying a route parameter of an initial navigation route based on the emotion data of the first user 102a. For example, the route parameter can be a travel style (e.g., a sporty ride, a gentle ride, a moderate ride, a scenic ride), a destination, a waypoint (e.g., point of interest), among others.

As an illustrative example, in one embodiment, upon determining the emotion data of the first user 102a illustrates a good emotion, the computing device 104b can modify the navigation of the second user 102b according to a sporty navigation route. In this embodiment, the computing device 104b can compare the emotion data of the first user 102a to a normal emotion data of the first user 102a. Based on the comparison, the computing device 104b can determine the emotion of the first user 102a indicates a good condition (e.g., happy, healthy), and the computing device 104b can calculate an alternative navigation route for the second user 102b to be a sporty navigation route based on an initial navigation route and/or an initial destination. A sporty navigation route can be a route with operation characteristics (e.g., speed, curves, and hills) that provide a more aggressive and fun experience. Thus, when the first user 102a is in a happy condition, the navigation route is modified to provide a navigation route agreeable with the happy condition.

As another illustrative example, upon determining the emotion data of the first user 102a illustrates a poor emotion, the computing device 104b can modify the navigation control of the second user 102b according to a less risky navigation route. In this embodiment, the computing device 104b can compare the emotion data of the first user 102a to a normal emotion data of the first user 102a. Based on the comparison, the computing device 104b can determine the current state of the first user 102a indicates a poor condition (e.g., sad, stressed, depressed, unhealthy), and the computing device 104b can calculate an alternative navigation route for the second user 102b to be a less risky navigation route based on an initial navigation route and/or an initial destination. A less risky navigation route can be a route with operation characteristics (e.g., speed, curves, and hills) that provide a gentler ride and less aggressive experience. Thus, when the first user 102a is in a sad condition, the navigation route is modified to provide a navigation route agreeable with the sad condition.

In some embodiments, the alternative navigation route is only executed for the second user 102b. In other embodiments, the alternative navigation route can be transmitted and/or used to control the navigation of one or more other users in the group of users 102. In one embodiment, the computing device 104b can transmit the alternative navigation route to the first user 102a (i.e., the first computing device 104a) and one or more of the other users (i.e., computing devices) that are part of the group of users 102. Thus, in some embodiments, the group leader (i.e., the second user 102b) can determine the alternative navigation route and transmit the alternative navigation route to one or more group followers that are part of the same group (i.e., the group of users 102).

Additionally, in some embodiments, at block 308, the method 300 can also include indicating the emotion of the first user 102a to the second user 102b. The emotion of the first user 102a can be provided to an indicator device, for example, an I/O device (not shown) of the second computing device 104b, which therefore displays the emotion of the first user 102a to the second user 102b. As discussed above with block 306, in some embodiments the method 300 includes recognizing a group leader of the same group of users 102. Thus, in this embodiment, the method 300 can indicate the emotion of the first user 102a only to the group leader, where the leader as the second user 102b. Privacy control of emotion data and navigation will be described in more detail herein with respect to FIG. 7.

Figure 4:
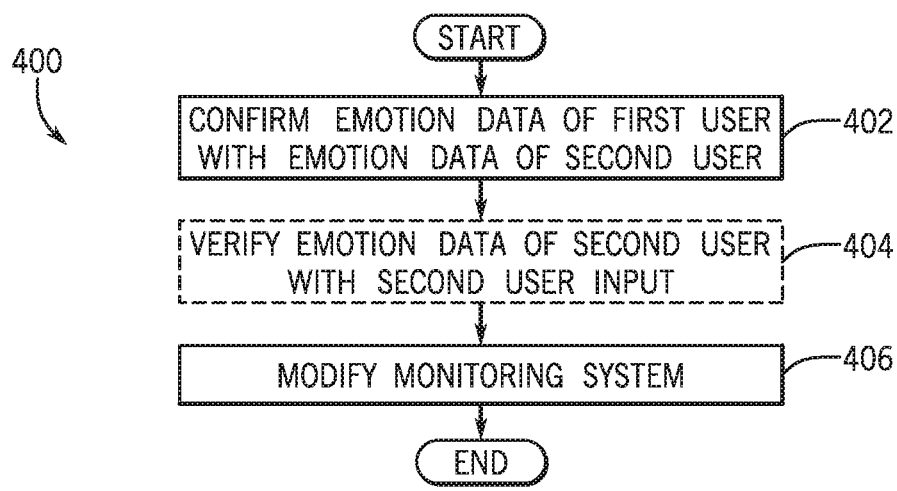
FIG. 4 is a process flow diagram of a method for confirming emotional data according to an exemplary embodiment.

As mentioned above, in some embodiments, emotion data of one user can be compared and/or verified with emotion data of another user. For example, in some embodiments, emotion data of the first user 102a can be compared and/or verified with the emotion data of the second user 102b, including real-time feedback of the second user 102b. Comparing and/or verifying emotion data can provide more accurate operation of the group-navigating system 100 and/or navigational control. Referring now to FIG. 4, a method 400 for controlling navigation of one or more users by confirming emotional data according to an exemplary embodiment will be discussed. The method 400 will be discussed with reference to FIGS. 1 and 2. It is understood that the blocks of the method 400 can be combined, omitted, or organized into different architectures for various embodiments. For example, one or more of the blocks of the method 400 can be implemented with the method 300, and vice versa.

At block 402, the method 400 can include confirming emotion data of the first user 102a with second emotion data of the second user 102b. As mentioned above, second emotion data illustrating emotion of the second user 102b can be generated based on information from the sensors (not shown) of the computing device 104b. In one embodiment, the emotion data and/or the emotion of the first user 102a can be compared with the emotion data and/or emotion of the second user 102b. For example, it can be determined at block 402 whether the emotion data and/or the emotion of the first user 102a and the emotion data and/or emotion of the second user 102b are the same or similar.

At block 404, the method 400 can include verifying the second emotion data of the second user 102b. In one embodiment, the verification is performed using real-time feedback in the form with second user input. Accordingly, in one embodiment, the second computing device 104b can request verification input from the second user via an I/O device (not shown) of the second computing device 104b. For example, the second computing device 104b can ask the user (e.g., via graphic text output or audible output) a question to verify the second emotion data. For example, if the second emotion data indicates the second user 102b is in a good emotion condition, the computing device 104b can provide audio and/or visual output (e.g., via an I/O device) asking the second user 102b whether the second user 102b is in a good emotion condition. In the embodiments discussed herein, this output can be referred to as verification output. The second user 102b can provide feedback in the form of input (e.g., audible, touch) in response to the question and the computing device 104b can verify the feedback with the second emotion data indicating the good emotion condition. In the embodiments discussed herein, the feedback in the form of input can be referred to as verification output and/or third emotion data.

At block 406, the method 400 can include modifying the group-navigating system 100. For example, normal emotion data levels or other predetermined thresholds used to determine the emotion of the second user 102b can be updated based on the confirmation and/or verification. This can improve the accuracy of determining emotion data illustrating emotion of the second user 102b. In other embodiments, any other type of machine learning, artificial intelligence, or neural networks can be used to refine the group-navigating system 100 and emotion data about each of the users in the group of users 102. It is understood that in some embodiments, at block 406, the method 400 can include modifying navigational control as discussed above with block 308 of FIG. 3.

Figure 5:
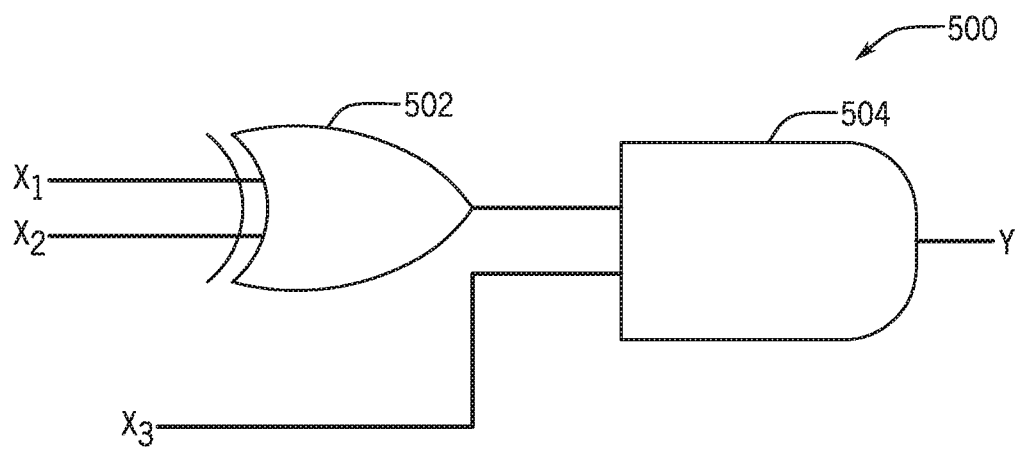
FIG. 5 is a schematic view of a logic gate for confirming emotional data according to an exemplary embodiment.

The confirmation and verification process of FIG. 4 is also illustrated in FIG. 5 by an exemplary logic gate 500 for confirming and/or verifying emotional data according to an exemplary embodiment. The logic gate 500 can be stored at any of the computing devices and/or at the server 106. As shown in FIG. 5, the emotion data and/or the emotion of the first user 102a is represented by variable $X_1$ and the emotion data and/or the emotion of the second user 102b is represented by variable $X_2$. The variables $X_1$ and $X_2$ are evaluated by the AND/OR logic gate 502. The result of the AND/OR logic gate 502 is then evaluated with the verification input (e.g., third emotion data) represented by variable $X_2$ at the AND gate 504. The output Y of the AND gate 504 can be used to modify the group-navigating system 100 as discussed above at block 406 and/or to modify navigational control as discussed above at block 308.

A detailed method 600 for confirming emotional data according to an illustrative example will now be discussed with reference to FIG. 6. In this embodiment, emotion data is confirmed and/or verified for a rest break necessity determination (e.g., using the rest break unit 134). As the group of users 102 travel, one or more of the users may require a rest break. Accordingly, the group-navigating system 100 can use the emotion data confirmation and/or verification process to better determine whether a user needs a rest break. More specifically, the group-navigating system 100 determines rest break necessity for one or more users of the group 102 and updates the group-navigating system 100 to provide better accuracy of rest break necessity determination.

Figure 6:
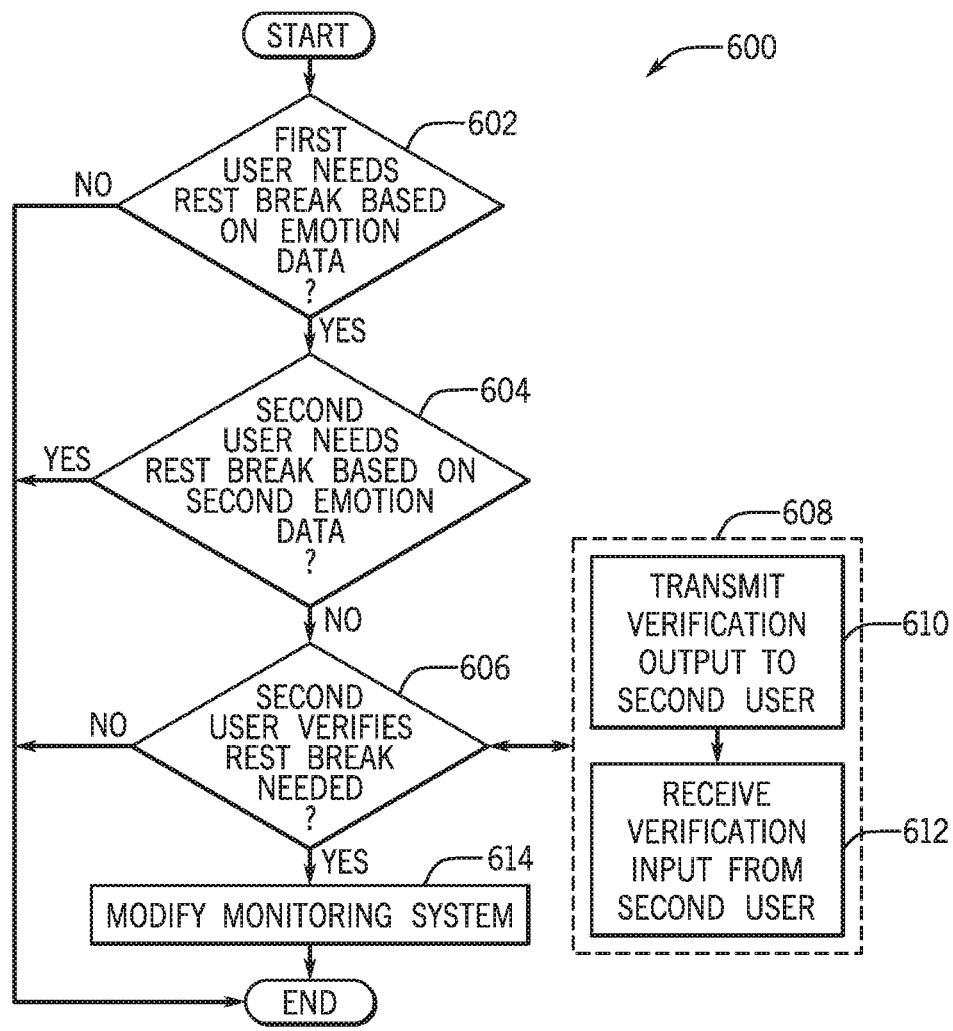
FIG. 6 is a process flow diagram of a detailed method for confirming emotional data according to another exemplary embodiment.

Referring now to FIG. 6, at block 602, the method 600 includes determining whether the first user 102a requires a rest break based on the emotion data of the first user 102a. For example, as discussed above, the processor 116 can determine whether the first user 102a requires a rest break by comparing the emotion data of the first user 102a with a predetermined threshold. Upon determining it is necessary (YES) for the first user 120a to take a rest break at block 602, at block 604 the method 600 includes determining whether the second user 102b requires a rest break based on the emotion data of the second user 102b. For example, the processor 116 can determine whether the second user 102b requires a rest break by comparing the emotion data of the second user 102b with a second predetermined threshold.

Upon determining it is not necessary (NO) for the second user 102b to take rest break at block 604, the method 600 proceeds to block 606. Thus, according to this example, the emotion data of the first user 102a and the emotion data of the second user 102b are not the same are similar since the first user 102a requires a rest break, but the second user 102b does not require a rest break. Accordingly, at block 606, the group-navigating system 100 verifies the second emotion data of the second user 102b by using feedback from the second user 102b. More specifically, at block 606, it is determined whether the second user 102b verifies a rest break is required. Said differently, it is determined if the second user 102b requires a rest break based on feedback from the second user 102b. Thus, this determination can be completed by verifying real-time feedback in the form of second user input at block 608.

More specifically, at block 610, the method 600 includes transmitting verification output to the second user 102b. As discussed above, the second computing device 104b can provide a verification output via an I/O device (not shown) of the second computing device 104b. For example, in this example, the verification output can include an audio output of the question, "Do you need a rest break?" to the second user 102b. In response to the verification output, at block 612, the second computing device 104b can receive verification input (e.g., third emotion data) from the second user 102b. In this example, the second user 102b can respond to the question (i.e., the verification output) via audio input, for example, by uttering, "YES" or "NO." In some embodiments, the verification output can be referred to as third emotion data. Thus, at block 612, in some embodiments, the method 600 includes receiving third emotion data of the second user based on input received from the second user.

Thus, at block 606, it is determine if the second user 102b verifies a rest break is needed based on the verification output. If the second user 102b indicates a rest break is required (YES), the method 600 proceeds to block 614. Thus, in this example, the second emotion data of the second user 102b indicated a rest break was not needed (i.e., at block 604), but the verification output indicates the second user 102b requires a rest break (i.e., at block 606). Accordingly, at block 614, the method 600 includes updating the group-navigating system 100 based on the verification output and/or third emotion data of the second user 102b. More specifically, in one embodiment, block 614 includes updating the group-navigating system 100 by updating a predetermined threshold (e.g., the predetermined threshold used at block 604) for determining a rest break necessity for the second user 102b based on the third emotion data of the second user 102b. This process can improve the accuracy of determining emotion data illustrating emotion of the second user 102b.

Referring back to the method 300 of FIG. 3, in some embodiments, modifying navigation control at block 308 can also include communicating emotion data and/or navigation information, including information about navigational changes to one or more users in the group of users 102. For example, in one embodiment, the group-navigating system 100 can indicate the emotion of the first user 102a to the second user 102b. For example, as discussed above, the emotion and/or the emotion data of the first user 102a can be provided to the second user 102b via the I/O device (not shown) of the second computing device 104b. Thus, the second user 102b can be aware of the emotion of the first user 102a. In some embodiments, the group-navigating system 100 can control who is provided the indication of the emotion data. For example, in some embodiments, the group leader maybe the only user who is allowed to view the emotion data of other users. Thus, in one embodiment, the group-navigating system 100 can recognize a leader of the same group of users 102, and indicate the emotion of the first user 102a only to the leader. Accordingly, privacy controls can be implemented within the group of users 102. This embodiment will now be described in more detail with reference to FIG. 7.

Figure 7:
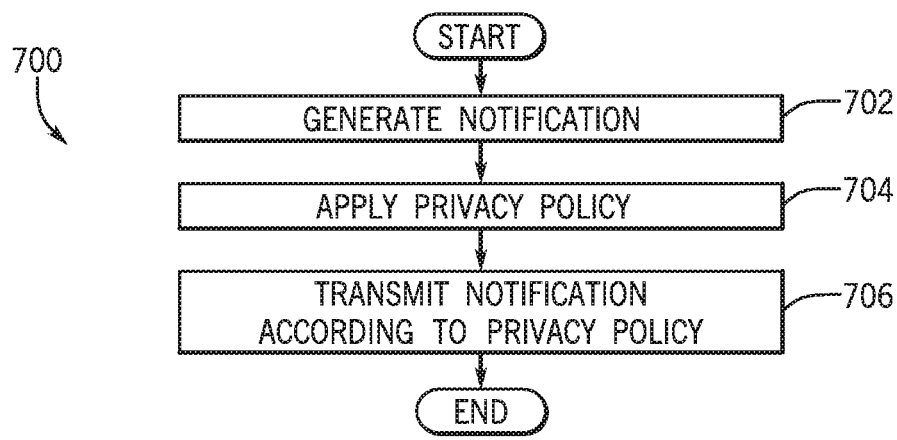
FIG. 7 is a process flow diagram of a method for controlling notifications of navigational control according to an exemplary embodiment.

Referring now to FIG. 7 a process flow diagram of a method 700 for navigation notification and privacy control according to an exemplary embodiment is shown. The method 700 will be discussed with reference to FIGS. 1 and 2. It is understood that the blocks of the method 700 can be combined, omitted, or organized into different architectures for various embodiments. For example, one or more of the blocks of the method 700 can be implemented with the method 300, the method 400, the method 600, and vice versa.

At block 702, the method 700 includes generating a notification. In some embodiments, the notification is an emotion notification including the emotion of the first user 102a. In other embodiments, the notification also includes navigation information, for example, information about the modified navigation control (e.g., determined at block 308 of FIG. 3). The second computing device 104b can generate the notification as an output about the emotion of the first user 102a and/or the modified navigation route. The navigation can include content, with for example, the emotion of the first user 102a, the alternative navigation route, a reason for the navigational modification, and other navigation information. As will be discussed herein, the notification can be transmitted to one or more of the users of the group of users 102 and executed at the one or more of the computing devices 104 (e.g., displayed via an I/O device at each respective computing devices).

However, in some embodiments, given the personal nature of the emotion data and/or the reason for modifying navigational control, the content of the notification and/or the recipients of the notification can be restricted and/or controlled. Accordingly, at block 704, the method 700 includes applying a privacy policy to the notification. For example, a privacy policy 138 can be stored at the data 120, the data 146, and/or the data (not shown) of the second computing device 104b. The privacy policy 138 can include rules that restrict the content of the notification based on the emotion data of the first user 102a. For example, the group-navigating system 100 can apply a privacy policy to the notification that restricts the content of the notification based on an identification of the one or more users that are part of the group of users 102.

As an illustrative example, based on the privacy policy 138, emotion data of the first user 102a should not be displayed to the third user 102c. Thus, the second computing device 104b can generate a notification for the first user 102a and the fourth user 102d that includes the emotion data of the first user 102a, and can generate a notification for the third user 102c that does not include the emotion data of the first user 102a. As another illustrative example, emotion data of the first user 102a can be restricted based on the type of the emotion data. For example, the privacy policy 138 may indicate that if the emotion data of the first user 102a illustrates a poor emotion, first user 102a may not want other users in the group of users 102 to know about this condition. Thus, the privacy policy 138 can include predetermined conditions/emotion data for each user that should be restricted and/or redacted from the notification.

At block 706, the method 700 includes transmitting the notification to the one or more users that are part of the group 102 according to the privacy policy 138. Thus, referring to the illustrative example above, in one embodiment, at block 706, the group-navigating system 100 can select from the one or more users that are part of the group of users 102 that meet a criteria of a privacy policy 138 and transmit the notification to the selected users. Accordingly, appropriate navigational control of the one or more users in the group of users 102 can be executed and communicated to other users while still maintaining the privacy of the users.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method for controlling navigation, comprising:
   generating, by a first controller, an emotion data of a first user illustrating emotion of the first user based on information received from a sensor;
   determining, by the first controller, whether it is necessary for the first user to take a rest break based on the emotion data of the first user;
   transmitting the emotion data of the first user to a second controller configured to control a navigation of a second user, wherein the first user and the second user are members of a same group and each member of the same group have a same navigation destination;
   generating, by the second controller, a second emotion data of the second user illustrating emotion of the second user based on information received from a second sensor;
   determining, by the second controller, whether it is necessary for the second user to take a rest break based on the second emotion data of the second user; and
   upon determining the emotion data of the first user illustrates a drowsy condition or upon determining it is necessary for the first user to take the rest break, changing, by the second controller, a destination of the second user to take a rest break, determining, by the second controller, an alternative navigation route based on the changed destination, and modifying, by the second controller, the navigation of the second user according to the alternative navigation route, thereby also modifying navigation of one or more members of the same group according to the alternative navigation route.

2. The computer-implemented method of claim 1, wherein the first user is a crew of a first vehicle and the second user is a crew of a second vehicle.

3. The computer-implemented method of claim 1, including indicating the emotion of the first user to the second user.

4. The computer-implemented method of claim 1, including recognizing a leader of the same group, wherein the second controller is configured to control the navigation of the leader as the second user.

5. The computer-implemented method of claim 1, including recognizing a leader of the same group, indicating the emotion of the first user only to the leader, and wherein the second controller is configured to control the navigation of the leader as the second user.

6. The computer-implemented method of claim 1, including upon determining it is necessary for the first user to take the rest break based on the emotion data of the first user, and it is not necessary for the second user to take the rest break based on the second emotion data of the second user, acquiring user input from the second user about a necessity of taking the rest break, and wherein upon determining it is necessary for the second user to take the rest break based on the user input, updating the second controller to modify how to determine whether it is necessary for the second user to take the rest break based on the second emotion data thereby increasing a likelihood of determining the rest break is necessary for the second user.

7. A system for controlling navigation, comprising:
   a first controller configured to generate an emotion data of a first user illustrating emotion of the first user based on information received from a sensor;
   a first rest break unit operably connected for computer communication to the first controller, wherein the first rest break unit determines whether it is necessary for the first user to take a rest break based on the emotion data of the first user;
   a second controller operably connected for computer communication to the first controller, wherein the first controller is configured to transmit the emotion data of the first user to the second controller, and the second controller is configured to generate a second emotion data of the second user illustrating emotion of the second user based on information received from a second sensor, wherein the first user and the second user are members of the same group; and
   a second rest break unit operably connected for computer communication to the second controller, wherein the second rest break unit determines whether it is necessary for the second user to take a rest break based on the second emotion data of the second user, wherein when the emotion data of the first user illustrates a drowsy condition or the first rest break unit determines it is necessary for the first user to take the rest break, the second controller controls navigation by changing a destination of the second user to take a rest break, determining an alternative navigation route based on the changed destination, and controlling navigation of the second user according to the alternative navigation route, thereby also modifying the navigation of one or more members of the same group according to the alternative navigation route.

8. The system of claim 7, wherein the first user is a crew of a first vehicle and the second user is a crew of a second vehicle.

9. The system of claim 7, including an indicator indicating the emotion data of the first user to the second user.

10. The system of claim 7, including a recognition unit configured to recognize a leader of the same group and the second controller is configured to control navigation for the leader as the second user.

11. The system of claim 7, including a recognition unit configured to recognize a leader of the same group, and an indicator indicating the emotion data of the first user only to the leader of the same group, wherein the second controller is configured to control navigation for the leader as the second user.

12. The system of claim 7, wherein the second controller controls navigation by modifying a route parameter of an initial navigation route, wherein the route parameter is at least one of: a travel style, a destination, and a waypoint.

13. The system of claim 7, wherein upon determining it is necessary for the first user to take the rest break based on the emotion data of the first user, and it is not necessary for the second user to take the rest break based on the second emotion data of the second user, the second controller acquires user input from the second user about a necessity of taking the rest break, and wherein upon determining it is necessary for the second user to take the rest break based on the user input, the second controller updates the second rest break unit to modify how to determine whether it is necessary for the second user to take the rest break based on the second emotion data thereby increasing a likelihood of determining the rest break is necessary for the second user.

14. A non-transitory computer-readable storage medium storing instructions that, when executed by a computer, causes the computer to perform a method comprising:

receiving information about a first user from a first sensor;
generating emotion data of the first user illustrating emotion of the first user based on the information about the first user;
transmitting the emotion data of the first user to a controller, wherein the controller controls navigation for a second user, wherein the first user and the second user are members of a same group;
receiving information about a second user from a second sensor;
generating a second emotion data of the second user illustrating emotion of the second user based on the information about the second user; and
upon determining the emotion data of the first user illustrates a drowsy condition or upon determining it is necessary for the first user to take a rest break, changing a destination of the second user to take a rest break, determining an alternative navigation route based on the changed destination, and modifying navigation for the second user and one or more members of the same group according to the alternative navigation route.

15. The non-transitory computer-readable storage medium of claim 14, wherein the first user is a crew of a first vehicle and a second user is a crew of a second vehicle.

16. The non-transitory computer-readable storage medium of claim 14, including recognizing a leader of the same group, wherein the controller controls navigation for the leader as the second user.

17. The non-transitory computer-readable storage medium of claim 14, including recognizing a leader of the same group, indicating emotion of the first user only to the leader of the same group, wherein the controller controls navigation for the leader as the second user.

* * * * *